June 18, 1940.  E. E. WEMP  2,205,054
HYDRAULIC CLUTCH
Filed Aug. 5, 1937  3 Sheets-Sheet 1

INVENTOR.
Ernest E. Wemp
BY
Barnes, Kisselle, Laughlin & Raisch
ATTORNEYS

INVENTOR.
Ernest E. Wemp

Patented June 18, 1940

2,205,054

UNITED STATES PATENT OFFICE 2,205,054

HYDRAULIC CLUTCH

Ernest E. Wemp, Detroit, Mich.

Application August 5, 1937, Serial No. 157,502

9 Claims. (Cl. 192—12)

This invention relates to a hydraulic torque transmitting coupling or connection and particularly to a structure which may be termed a hydraulic clutch wherein the torque transmitting coupling may be established or disestablished.

A principal object of the invention is to provide a hydraulic clutch which may be operated at will or otherwise, for establishing or disestablishing the coupling or connection. In automotive vehicles, for example, the hydraulic clutch of this invention may be used in place of the usual friction clutch and it may be operated with ease and facility. Engagement of the clutch may be accomplished with a smooth non-chattering, non-grabbing action and the work required to manipulate or operate the hydraulic clutch may be considerably less than that required to operate a conventional spring-pressed friction clutch. To this end, a hydraulic clutch is contemplated which employs the so-called vortex principle, wherein the vortex chamber is capable of being broken or destroyed, so to speak, to disestablish the connection, and wherein the vortex chamber is set up or made when the coupling is established. In this regard, the vortex chamber is formed of parts which are relatively movable.

Further objects of the invention reside in novel features of construction which makes it feasible to manufacture the clutch at a low cost and largely from parts formed of sheet metal stampings. Other objects will become apparent as the detailed description progresses in connection with the accompanying drawings wherein one structure for carrying out the invention is shown.

Figure 1:
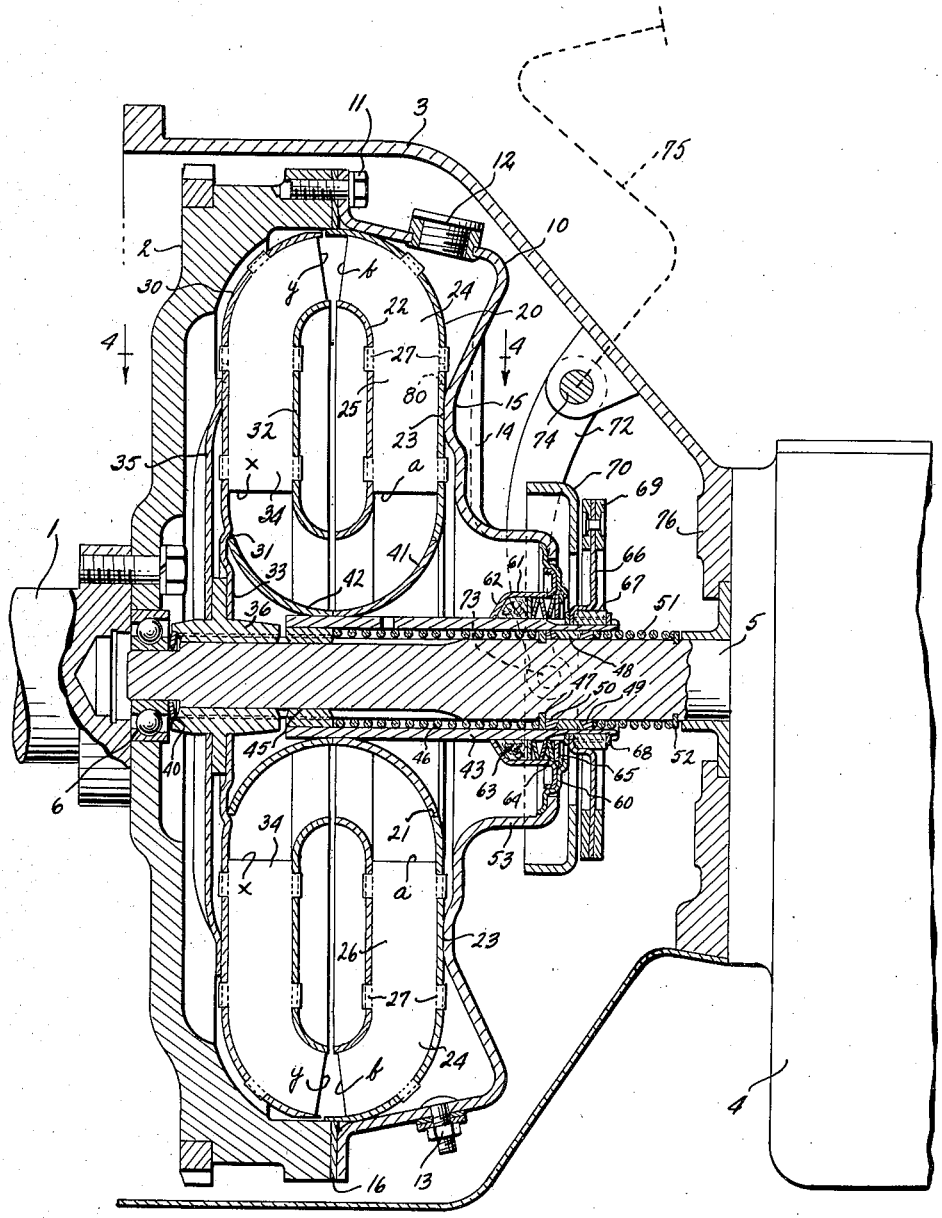
Fig. 1 is a cross sectional view taken through a clutch constructed in accordance with the invention showing the parts in the position taken when the coupling is established.

In the accompanying drawings, the crank shaft of an engine is illustrated at 1 and the usual fly wheel is illustrated at 2 connected to the crank as shown. The clutch structure may be located in a housing 3 which may be the usual so-called bell housing secured to the engine. A selective gear transmission may be used in connection with the hydraulic clutch, the transmission housing being illustrated at 4 and connected to the bell housing 3. A driven shaft 5 extends into this transmission and one end is piloted in the fly wheel by a bearing 6.

A suitable cover plate is illustrated at 10 which is secured to the fly wheel by means of cap screws 11 and which has a sealed relation with the shaft 5, or a part appurtenant thereto, where the same extends out through the cover plate. This will be described later. This cover plate may be formed of a sheet metal stamping, is provided with a filler opening closed by a suitable plug 12, and may be equipped with balancing devices 13. The balancing device opposite the plug 12, shown in Fig. 1, may be of such weight as to balance the filler structure. This clutch cover plate may be formed with alternate ridges and furrows 14 and 15, this formation lending strength thereto and the furrows being arranged to be attached to one of the members forming the vortex chamber. The cover plate is preferably attached to the fly wheel by the use of a gasket 16 to make a fluid tight joint.

The impeller is formed by a body member 20 which may be a sheet metal stamping of circular form and shaped in cross section as illustrated in Fig. 1 and terminating at 21. The core of the impeller may be a circular stamping having a cross sectional shape, as illustrated in Fig. 1, and designated 22. The member 20 of the impeller is secured to a part driven by the engine and to this end, the member 20 may abut against and be secured to the depressed portions 15 of the cover plate. It will be noted that these members may contact with each other as at 23. The type of attachment is subject to variation; for example, these abutting portions may be welded in any suitable manner, and one advantageous manner of making the connection is to braze the parts together with copper. The vanes of the impeller lie between the members 20 and 22 and are generally illustrated at 24. These vanes terminate at $a$ and $b$.

Figure 3:
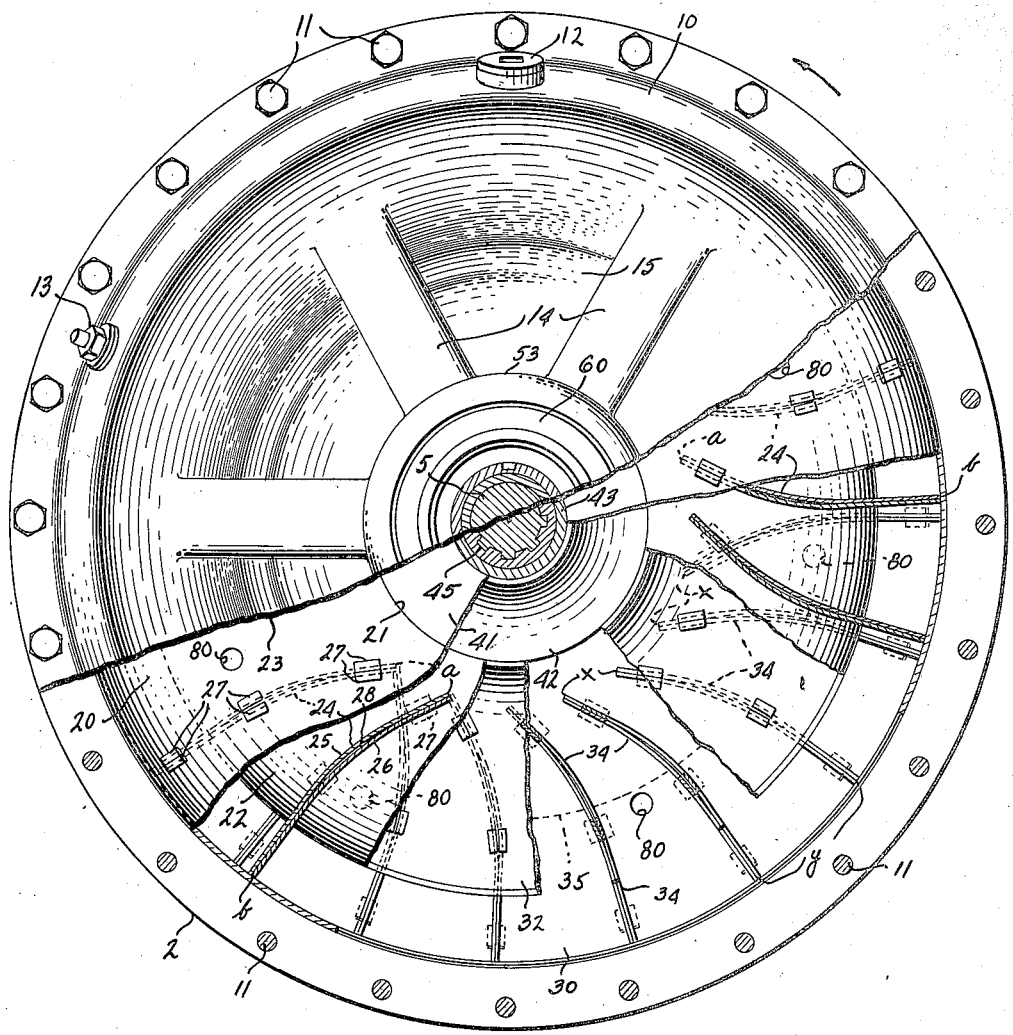
Fig. 3 is a view partly in rear elevation with parts cut away and parts in section illustrating a portion of the cover plate and the vane structure.
Figure 4:
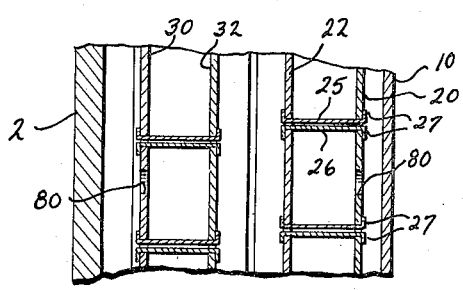
Fig. 4 is a cross sectional view taken substantially on line 4—4 of Fig. 1.

One structure for these vanes is shown in Figs. 3 and 4 where it will be seen that each vane comprises two members 25 and 26 placed substantially together and having tongues or tabs which extend through slots in the members 20 and 22 and then are fashioned over as illustrated in Fig. 4; these tabs are shown at 27. One form which the vanes may take is illustrated in Fig. 3 and in this view, the formation of the vanes is shown. For the purpose of obtaining the desired cross sectional shape of the passageway between vanes, the vanes are of increased cross sectional dimensions in an intermediate zone, which may be accomplished by a spacing of the two strips as illustrated at 28. The two vane forming strips may be united adjacent their ends and may be secured to the members 20 and 22 adjacent the tabs 27 by the copper brazing process. On the other hand, the two strips may be spot welded adjacent their ends leaving their intermediate zones free for the spacing.

The runner may have a body 30 and a core 32 with vanes 34 therebetween formed and secured to the body and core in a manner as above described in connection with the impeller. These vanes have terminal ends at $x$ and $y$. The cores 22 and 32 may be identical. The vanes 24 and 34 may be the same and the body members 20 and 30 may be the same, except that the body member 30 may have an offset 31 and an inwardly extending part 33. The runner may also include a reinforcing back plate 35, and the parts 33 and 35 may be secured to the runner hub 36 which is secured to the shaft 5 as by means of splines or the like. A washer member 40 may be secured to the hub for taking end thrust, the washer contacting with the inner race of the bearing 6.

Thus it will be seen that the impeller and runner may be formed of sheet metal parts, a number of which parts are identical and merely placed in reverse position, and these may be assembled by the copper brazing process. The reinforcing member 35 may be joined to the body member 30 by the copper brazing process and the members 33 and 35 may be secured to the flange of the hub by this process or by any other means, such as rivets or the like.

The copper brazing process referred to is not in itself part of this invention. However, it might be said that the process briefly is as follows: The articles to be joined, which may be of ferrous metal, are placed together and passed through a furnace containing a reducing atmosphere, and the temperature exceeds copper melting temperature. A suitable supply of copper in the form of a strip of wire, or pieces of copper laid in proper position, or copper dust mixed with a carrier is disposed adjacent the parts to be united. The copper melts in the furnace, runs in between the facing parts and unites them when the copper solidifies. While reference has been specifically made to copper, the term shall be understood to include copper alloys or other cuprous metal.

There is what may be termed a guide for completing the vortex chamber which functions in cooperation with the impeller and the runner. This guide takes the form of a circular member of channel shape in cross section and, as shown herein, is formed of two pieces 41 and 42 each of slight concavo-convex form in cross section formed of sheet metal, slipped over a sleeve 43 into abutting relationship and united to the sleeve as by means of copper brazing or the like. This guide is formed of the two members for facilitating manufacture, which in effect, become one piece when united to the sleeve 43. In fact, the butt joint between the two members may be copper brazed together. This guide has a running joint with the impeller and a close fit with the runner, namely, at the inner circumferential edge 21 of the impeller member 20, and at the circumferential offset 31 of the runner member 30 respectively. The running clearance may be from about .005 to .0010 of an inch.

This guide member is axially shiftable and when in operating position with the hub 36 against the thrust bearing 6, the guide member is in substantial alignment with the impeller and runner members, as illustrated in Fig. 1.

The sleeve 43 is axially shiftable and it is splined to the driven shaft as at 45. A coil spring 46 surrounds the driven shaft and urges the sleeve to the left, as Fig. 1 is viewed, and reacts against a split ring 47 carried by the driven shaft. Packing material 48 lies between two washers 49 and 50 and is held compact by a spring 51 backed up by a split ring 52.

Figure 2:
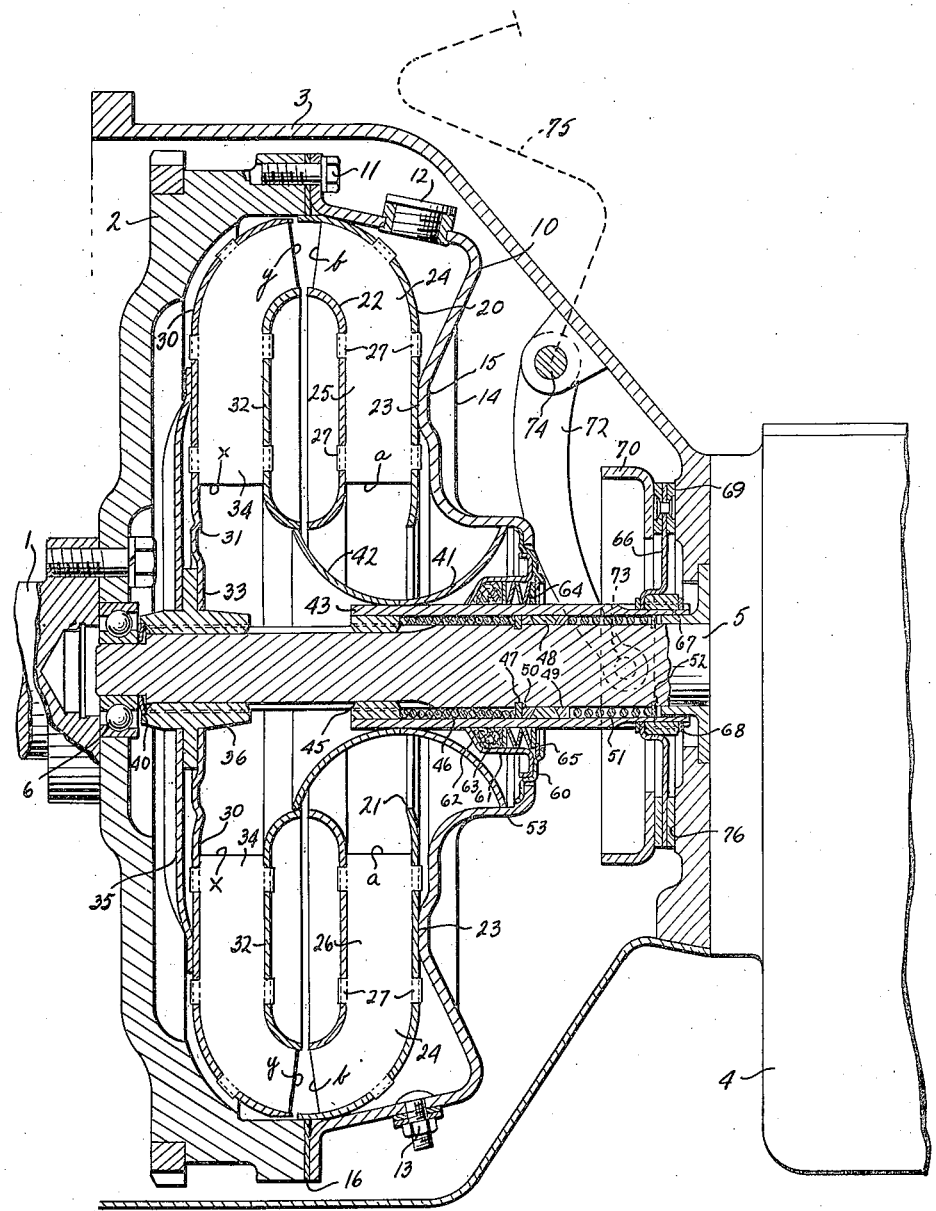
Fig. 2 is a cross sectional view similar to Fig. 1 illustrating the position of the parts when the coupling is broken or disestablished.

The cover plate is formed with a circular extension 53 to receive the guide as shown in Fig. 2, preferably with a running clearance of about .005 to .0010. A packing gland is used between the cover plate and the sleeve and this packing gland may be formed of sheet metal parts also copper brazed together. In the form shown, a stamping 60 may be secured to the cover plate where the same overlaps the same as shown, and another sheet metal stamping or drawing may abut the member 60 and be copper brazed thereto. This member is illustrated at 61 and may have an extension 62 which is formed to terminate in close proximity to the sleeve for the reception of packing material 63. A spring 64 may be backed up by a washer 65 for maintaining the packing 63 under compression.

For the purpose of shifting the sleeve 43 and thereby the guide, a control disc 66 having a hub 67 may be secured to the sleeve 43 as by means of splines, or the like, and held thereon by a split spring ring 68. This disc may be provided with facing material 69.

A control member 70 may be carried by the opposite arms of a release fork 72, by means of the pins 73, the control fork being pivoted as at 74. This control fork is to be rocked by any suitable means such as an instrument corresponding to the usual clutch release pedal illustrated in dotted lines at 75. This dotted line illustration is out of proportion but demonstrates the operating member. The bell housing or other stationary part may be provided with a surface 76 to be engaged by the friction facing material 69.

By reference to Fig. 3, the vanes of the runner will be seen as being disposed in a position which may be described as opposite that position of the vanes of the impeller. Preferably, the impeller body 20 and the runner body 30 are provided with apertures 80 leading into the space defined by the fly wheel and cover plate surrounding the impeller and runner to equalize the pressures. The ribs 14 form connections between the outer and inner portions of the chamber defined by the fly wheel and cover plate.

It probably is unnecessary to go into the operation of the hydraulic coupling at great length since the operation of such hydraulic clutches or fluid couplings, as they are sometimes called, is well-known to those versed in the art. Suffice it to say that in the operation of the clutch, when it is conditioned, as shown in Fig. 1, the liquid flows in the vortex chamber, entering between the impeller vanes 24 at the point $a$ and passing out at the point $b$; the liquid enters the runner vanes at $y$ and passes out at $x$. The guide 41 serves to complete the vortex chamber and constitutes a conduit or passageway for the fluid as it flows from the outlet $x$ to the inlet $a$. As the liquid discharges from the impeller at $b$, it impinges upon the runner vanes and impresses a turning moment or torque upon the runner. However, as the liquid leaves the runner vanes at $x$, no substantial torque or turning moment is imparted to the guide. What slight turning moment may be transmitted to the guide is that of the friction of the liquid thereon. Upon reversal of the torque, the runner becomes the driving member to the end that the driven shaft or vehicle may drive the engine and the engine may serve as a decelerating agency. This also permits the engine to be started by towing the vehicle.

This hydraulic clutch may be operated at will by the physical effort on the part of the operator in a manner substantially identical to the operation of a conventional friction clutch. To release the clutch, the pedal 75 is depressed; this carries the release member 70 to the right, as shown in the drawings, and engages the disc 66. In this manner, the parts may be shifted to the position shown in Fig. 2. This action takes place against the spring 46. This destroys or breaks the vortex chamber, in that the guide is disaligned from the remaining portion of the chamber and also in that the forward wall thereof forms a substantial closure separating the runner and impeller. Of course, there may be some leakage of oil through the clearance between the guide and the core 32 or at other places, but this slight leakage will transmit no substantial torque.

When the clutch is rotating at relatively high speeds, it is desirable that the driven shaft be decelerated quickly to facilitate the shifting of the gears in the gear box 4. To decelerate the shaft 5, it is necessary also to decelerate the runner which is connected thereto. This is accomplished in whole or in part by the frictional engagement between the facing 69 and the release member 70; if necessary, the pedal may be depressed far enough to pack the facing 69 between the member 70 and the face 76, as shown in Fig. 2. This applies a substantial braking action serving to decelerate the driven shaft and runner.

To engage the clutch, the pedal may be relieved gradually or quickly in accordance with the desires of the operator or the requirements of the situation and the spring 46 advances the guide to its Fig. 1 position. Thus again, torque is imparted to the runner and driving power is intermediate to the driven shaft. This engagement takes place smoothly with an entire absence of chatter or grabbing action, although the operator has control of the rapidity of the engagement by the proper manipulation of the lever 75.

It is understood, of course, that the chamber formed by the fly wheel and cover plate will be substantially filled with suitable liquid, such as an oil. No running seal joints are embodied in the structure; the shaft 5 and the sleeve 43 are splined together so that there is no runnnig joint at the packing 48. During operation, the sleeve 43 runs with the cover plate so that at this time there is no running joint at the packing 63, except for what slippage there may be in the transmission of torque from the impeller to the runner.

In the operation of the clutch, thrust forces are localized in the clutch itself. Thrust from the runner is taken by the bearing 6 and these forces are transmitted to the fly wheel; the opposite thrust of the impeller is taken by the cover plate and transferred to the fly wheel; thus the thrust forces are balanced out in the clutch structure. The only thrust on the crank shaft of the engine is that of the spring 46 which is of small magnitude. Due to the shape and form of the guide, end thrusts thereon are balanced. In other words, the guide member is not only substantially inert as to torque but also as to thrust. Since there is no thrust on this member, there is no resistance to the axial movement of the guide member even though the radial velocity of the fluid around the vortex structure may be relatively great.

Thus a hydraulic clutch is provided wherein a so-called vortex chamber is used and wherein this vortex chamber is broken or destroyed to discontinue the transmission of torque or driving action and this is under the control of the operator. No substantial torque is imparted to the guide either in operating position or in inoperating position and, accordingly, the shifting of the guide in the control of the clutch requires little work on the part of the operator. It is only necessary to overcome the action of the spring 46 plus the element of friction and what small torque or forces may be applied to the guide. It might be considered that the guide is an inert element so far as torque is concerned, the same merely serving as a passageway to make or complete the vortex chamber. For convenience, the terms "make" and "break" may be used in describing the changing conditions of the vortex chamber. As has been observed, most of the parts, except for the drive shaft, hub and sleeve, and like elements, may be formed of sheet metal stampings assembled together and united in a manner as by means of welding or copper brazing. The copper brazing is thought to be preferred but, of course, the invention is not limited to this form of joint.

I claim:

1. A hydraulic clutch comprising a rotary impeller, a rotary runner, said impeller and runner forming the radially outward zone of a vortex chamber and a member shiftable axially and which in one position forms the complete inner zone of the vortex chamber and in another position breaks the vortex chamber.

2. A hydraulic clutch comprising a rotatable driving member, an impeller connected thereto, a driven shaft, a runner connected thereto, a sleeve over the shaft and slidably connected thereto, a member mounted on the sleeve and cooperating with the impeller and runner to complete a vortex chamber and means for shifting the sleeve and member to break the vortex chamber.

3. A hydraulic clutch comprising a rotatable driving member, an impeller connected thereto, a driven shaft, a runner connected thereto, a sleeve over the shaft and slidably connected thereto, a member mounted on the sleeve and cooperating with the impeller and runner to complete a vortex chamber a spring acting upon the sleeve to hold the member in a position to complete the vortex chamber, a friction member secured to the sleeve and control means for engagement with the friction member to shift the sleeve to in turn shift the said member to vortex breaking position and for applying decelerating friction to the sleeve, the driven shaft and runner.

4. A hydraulic clutch comprising a rotatable driving member, an impeller connected thereto, a driven shaft, a runner connected thereto, a sleeve over the shaft and slidably connected thereto, a member mounted on the sleeve and cooperating with the impeller and runner to complete a vortex chamber, a spring acting upon the sleeve to hold the member in a position to complete the vortex chamber, a friction member secured to the sleeve, control means for engagement with the friction member to shift the sleeve to in turn shift the said member to vortex breaking position and for applying decelerating friction to the sleeve, the driven shaft and runner and a fixed friction surface against which the friction member may be urged by the control member for applying additional decelerating friction thereto.

5. A hydraulic clutch comprising, a driving member, an impeller secured thereto, a driven shaft, a runner secured thereto, a sleeve over the driven shaft and slidably connected thereto, a member mounted upon the sleeve and cooperating with the impeller and runner to complete a vortex chamber, means for shifting the sleeve axially and thereby said member to break the vortex chamber, said driven shaft and sleeve extending out through the driving member, a packing gland between the driven shaft and sleeve and another packing gland between the driving member and sleeve.

6. In a hydraulic clutch, a vane structure for disposition between the body member and core member of an impeller or runner, comprising two sheet metal members placed together and secured substantially at their opposite edges to the body member and core member, said two members being spaced apart from each other in an intermediate zone to in part define the shape of the passageway between two adjacent vanes.

7. In a hydraulic clutch, an impeller or runner structure comprising, a body, a core, a plurality of vanes between the body and core, each comprising two sheet metal member spaced apart for a portion of their length and secured to the body and core by extensions passing through slots in the body and core and fashioned to overlap the same.

8. A hydraulic clutch comprising a rotary impeller member, a rotary runner member, said impeller and runner both having inner and outer walls defining communicating fluid passageways, some of said walls terminating radially outwardly of the axis, a control member mounted on the axis and presenting an outwardly facing circumferential channel formation, means for shifting the control member axially to in one position substantially align the walls of the channel formation with the outer walls of the impeller and runner to complete the vortex chamber, and to in another position substantially align one wall of the channel formation with an inner wall of one of the member to break the vortex chamber and substantially close the passageways to flow of fluid.

9. A hydraulic clutch comprising a rotary impeller, a rotary runner, said impeller and runner forming the radially outward zone of a vortex chamber, a driven member to which the runner is connected, a member slidably and non-rotatably connected to the driven member and shiftable axially, and which in one position forms the complete inner zone of the vortex chamber, and which in another position breaks the vortex chamber, and means for applying a braking action to said member when it is in the position for breaking the vortex chamber.

ERNEST E. WEMP.